(12) United States Patent
Fantappié

(10) Patent No.: US 11,612,269 B2
(45) Date of Patent: Mar. 28, 2023

(54) SYSTEM FOR MIXING AND DISPENSING A BEVERAGE

(71) Applicant: Giancarlo Fantappié, Rancho Palos Verdes, CA (US)

(72) Inventor: Giancarlo Fantappié, Rancho Palos Verdes, CA (US)

( * ) Notice: Subject to any disclaimer, the term of this patent is extended or adjusted under 35 U.S.C. 154(b) by 540 days.

(21) Appl. No.: 16/777,680

(22) Filed: Jan. 30, 2020

(65) Prior Publication Data
US 2020/0163484 A1    May 28, 2020

Related U.S. Application Data

(63) Continuation of application No. 14/939,621, filed on Nov. 12, 2015, now abandoned.

(51) Int. Cl.
*A47J 31/40* (2006.01)
*A47J 31/36* (2006.01)
*B65D 85/804* (2006.01)

(52) U.S. Cl.
CPC ......... *A47J 31/407* (2013.01); *A47J 31/3628* (2013.01); *A47J 31/3633* (2013.01); *A47J 31/3638* (2013.01); *B65D 85/8046* (2013.01); *B65D 85/8049* (2020.05); *B65D 85/8052* (2020.05); *B65D 85/8055* (2020.05)

(58) Field of Classification Search
CPC .. A47J 31/3695; A47J 31/407; A47J 31/3628; A47J 31/3633; A47J 31/3638; B65D 85/8046; B65D 85/8049; B65D 85/8052; B65D 85/8055
USPC ........... 99/295, 287, 297, 302 P, 302 R, 315, 99/318, 385, 300, 292, 307, 312, 323, 99/319; 100/73
See application file for complete search history.

(56) References Cited

U.S. PATENT DOCUMENTS 4,484,515 A    11/1984 Illy
5,897,899 A    4/1999 Fond
(Continued)

FOREIGN PATENT DOCUMENTS

WO    WO2005080223    9/2005

OTHER PUBLICATIONS

PCT Cooperation Treaty, PCT Written Opinion of International Searching Authority, Jan. 30, 2017, International Application No. PCT/US16/61493, 10 pages, Alexandra, Virginia.

*Primary Examiner* — Sang Y Paik
*Assistant Examiner* — Erwin J Wunderlich
(74) *Attorney, Agent, or Firm* — Stetina Brunda Garred and Brucker

(57) ABSTRACT

A system for mixing and dispensing a beverage is provided including a disposable pod containing a solute therein, inflow puncturing cap defining a plurality of spikes extending therefrom, an outflow puncturing cap defining a plurality of puncturing spikes extending therefrom and a translation mechanism for receiving the pod, translating the inflow puncturing cap towards the pod to puncture the pod upper surface and seat the pod proximate the outflow cap spikes. Heated, pressurized solvent fluid is injected into the pod, wherein the solvent and solute mix, causing the pod lower surface to expand against, and be punctured by the outflow puncturing cap spikes. The pod material, and pod thickness may be selected to allow puncture of the pod lower surface after a preferred brewing period has occurred.

20 Claims, 13 Drawing Sheets

(56) References Cited

U.S. PATENT DOCUMENTS

| | | |
|---|---|---|
| 7,028,604 B2 | 4/2006 | Cortese |
| 2003/0070554 A1 | 4/2003 | Cortese |
| 2008/0302252 A1 | 12/2008 | O'Brien et al. |
| 2012/0199011 A1* | 8/2012 | Cheng .................. A47J 31/3633 99/295 |
| 2012/0272830 A1* | 11/2012 | Gugerli .............. B65D 85/8064 426/115 |
| 2013/0084376 A1 | 4/2013 | Fischer et al. |
| 2013/0224340 A1 | 8/2013 | BenDavid |
| 2013/0239820 A1 | 9/2013 | Baldo |
| 2014/0130678 A1 | 5/2014 | Frydman |
| 2014/0178537 A1* | 6/2014 | Zweed .................... A23F 5/262 426/433 |
| 2015/0216353 A1 | 8/2015 | Polti |

\* cited by examiner

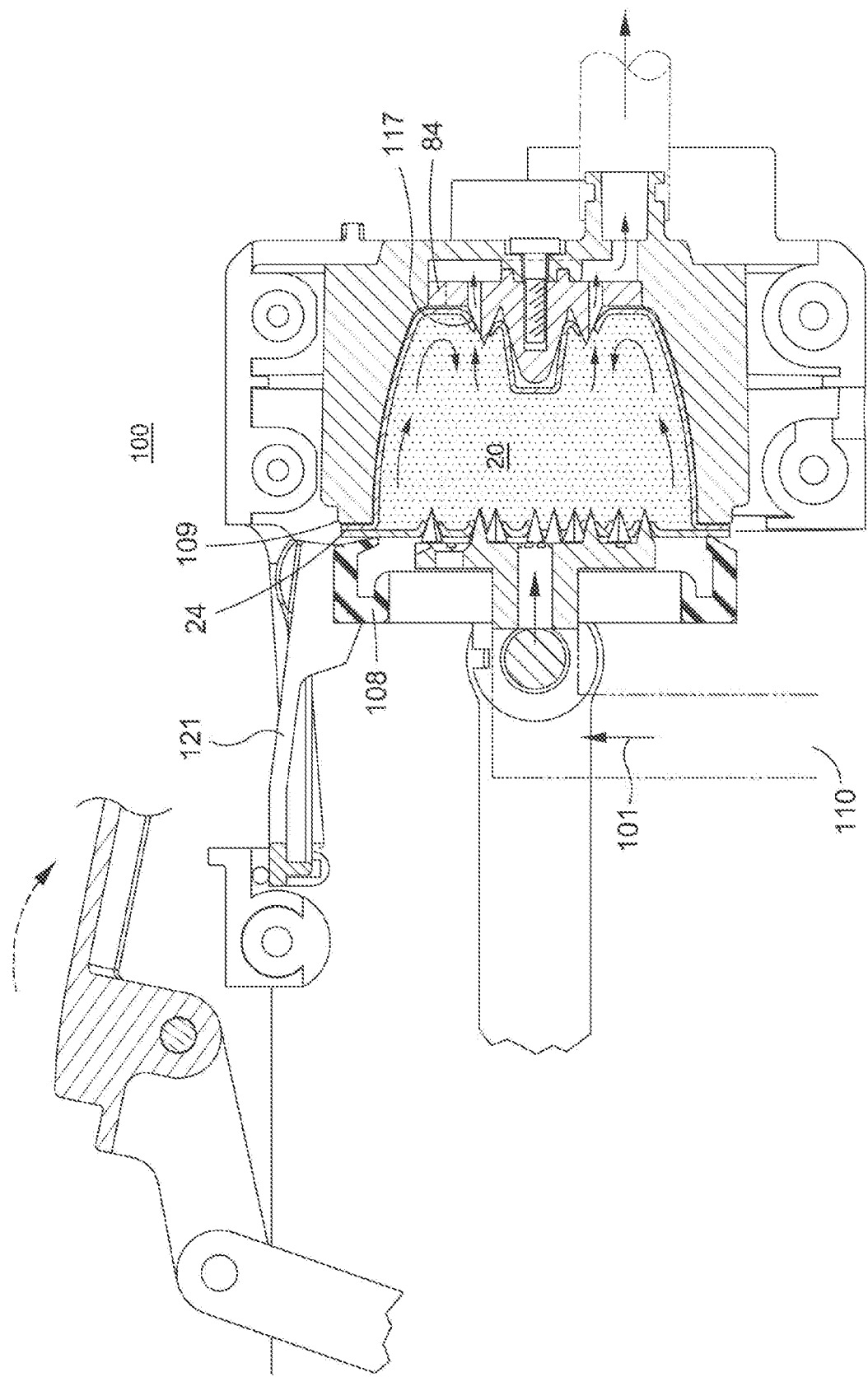

SYSTEM FOR MIXING AND DISPENSING A BEVERAGE

CROSS-REFERENCE TO RELATED APPLICATIONS

This continuation patent application claims the benefit under 35 U.S.C. § 119(e) to patent application Ser. No. 14/939,621 filed Nov. 12, 2015, the entire of which is incorporated herein by reference.

STATEMENT RE: FEDERALLY SPONSORED RESEARCH/DEVELOPMENT

Not Applicable

BACKGROUND

Field of Invention

The invention relates to the preparation of a food/beverage product for human consumption. In particular, the invention relates to a food/beverage product cartridge that enhances the preparation of food and beverage by promoting mixing between the food/beverage product and a fluid within the cartridge. The invention is suitable in particular for the preparation of a beverage in an automatic brewing machine.

Background of the Invention

There are numerous devices designed to prepare a single serving of a food product or beverage. In particular, disposable containers containing coffee grounds are suitable for automatic beverage machines. The automatic beverage machine typically contains a relatively large reservoir of fluid solvent compared to the volume of the disposable container. First, the disposable container with the beverage solute is placed within the beverage machine, as an example in a brewing chamber. Next, the beverage machine punctures the disposable container creating orifices in the container lining. The fluid solvent flows (at pre-determined temperature, pressure and flow rate) through the orifices and mixes with solute inside the disposable container, generating a food product or beverage such as a cup of coffee or cappuccino. This method of mixing fluid through punctured orifices inside a disposable container can introduce preferential flow paths that result in insufficient mixing. This wastes the unmixed food product within the container and negatively affects the taste. Attempts to overcome these shortcomings have been met with indifferent success. One such construction increases the flow pressure of the fluid entering the disposable container to promote further mixing. However, the increased flow pressure may cause coagulation of certain food product such the curdling of milk and coagulation of milk proteins. Another construction decreases the size and or number of orifices in the disposable container lining to restrict the exiting flow and prolong the mixing process to promote further mixing. Such constructions can result in slow flow rate of the beverage outflow or a prolonged contact of the fluid solvent with the food product in the cartridge, negatively affecting the beverage taste.

Therefore, an object of this invention is to improve the mixing process within the disposable container for an automatic beverage to enhance the taste of the beverage or food product.

A further object of this invention is to provide an improved disposable container shape that encourages static eddies in the flow entering the disposable container.

A further object of this invention is to provide a multiple-stage method of puncturing the container lining to prolong the mixing process within the disposable container.

A further object of this invention is to puncture the disposable container with spikes of differing number, orientation, and dimensions to minimize preferential flow paths.

A further object of this invention is to extract the beverage and or food product from the disposable container without causing coagulation of the food product.

A further object of this invention is to provide an improved disposable container that is sealed against contamination.

A further object of this invention is to provide an improved disposable container which maintains its structural integrity even when expanded and dually penetrated for inflow and outflow.

A further object of this invention is to provide an improved disposable container made of a polymer of a thickness that safely expands, under predetermined temperature and pressure, to facilitate container puncturing for beverage dispensing.

BRIEF SUMMARY

A system for mixing and dispensing a beverage is provided including a disposable pod containing a solute therein, an inflow puncturing cap defining a plurality of spikes extending therefrom, an outflow puncturing cap defining a plurality of puncturing spikes extending therefrom and a translation mechanism for receiving the pod, translating the inflow puncturing cap towards the pod to puncture the pod top surface and seat the pod proximate the outflow cap spikes. Heated, pressurized solvent fluid is injected into the pod, wherein the solvent and solute mix, causing the pod lower surface to expand against, and be punctured by the outflow puncturing cap spikes. The pod material, and pod thickness may be selected to allow puncture of the pod lower surface after a preferred brewing period has occurred.

In one embodiment the pod comprises a pierceable pod top and pod body defining sidewalls having a concave inner surface, and a base. The base preferably defines a base conical inward protrusion to facilitate alignment of the pod relative to the outflows puncturing cap. The pod lower surface may be formed to extend concentrically about the pod central conical protrusion. A pod base rim may be formed to extend concentrically about the central conical protrusion, intermediate the pod lower surface and the sidewalls.

The inflow puncturing cap may be formed to have first and second surfaces, and a plurality of solvent fluid receiving conduits extending therethrough. The inflow puncturing cap first surface may define a plurality puncturing spikes extending therefrom. The inflow puncturing cap may further define a plurality fluid distribution conduits extending across the inflow puncturing cap first surface, to distribute fluid received from one or more of the inflow puncturing cap fluid distribution conduits.

The outflow puncturing cap spikes may be formed to define inner channel fluid channels extending through the spikes. As the pod swells in response to receipt of the heated, pressurized solvent, the pod lower surface expands against the outflow puncturing cap spikes such that the spikes puncture the pod lower surface, and fluid within pod may be discharged through the spike channels, into a fluid discharge port.

The translation mechanism may be formed to define a pod receiving area for receiving the pod, an inflow puncturing cap receiving apparatus for receiving and supporting the inflow puncturing cap and an outflow puncturing cap housing for receiving and supporting the outflow puncturing cap. The outflow puncturing cap housing may define a pod seating surface for seating the pod such that the pod lower surface is disposed proximate the outflow puncturing cap spikes. The translation mechanism may further define a solvent infusion port in fluid communication with the inflow puncturing cap fluid conduits, for communicating the heated pressurized fluid solvent into the pod. The translation mechanism may further define a linkage assembly, mechanically coupled to the inflow puncturing cap, receiving apparatus, for translating the inflow puncturing cap between a first position, wherein the inflow puncturing cap spikes are outside of the pod, and a second position, wherein the inflow puncturing cap spikes puncture the pod top and the pod top rim abuts the pod seating surface. The period between the puncturing the pod top to allow heated pressurized fluid to enter the pod, and puncturing the pod lower surface, to allow the heated pressurized fluid to be discharged from the pod, may define the brewing period, which may be selected in accordance with a brewing requirement of a particular beverage.

In one embodiment, the pod lower surface and sidewalls may be formed of materials selected to be permeable when subject to a desired fluid solvent temperature and pressure level for the brewing period.

In one embodiment the pod lower surface and sidewalls may be formed of a thermoplastic material that is approximately 900 microns thick.

In one embodiment the translation mechanism may further include a pod resilient guide member. The guide member may be formed to be displaceable upon insertion of the pod into the pod receiving area, to facilitate orientation of the pod within the pod receiving area.

The resilient guide member may further facilitate disengaging the pod from the inflow puncturing cap spikes, after the beverage has been discharged from the pod, and the inflow puncturing cap is retracted towards its initial position.

BRIEF DESCRIPTION OF THE DRAWINGS

These and other features and advantages of the various embodiments disclosed herein will be better understood with respect to the following description and drawings, in which like numbers refer to like parts throughout, and in which:

FIG. 7C is a side sectional view of the translation mechanism where the pod lower surface has been expanded by infusion of heated, pressurized fluid, causing the pod lower surface to be punctured by the outflow puncturing cap spikes;

DETAILED DESCRIPTION

The above description is given by way of example, and not limitation. Given the above disclosure, one skilled in the art could devise variations that are within the scope and spirit of the invention disclosed herein, including various ways of seating and/or translating the inflow and/or outflow puncturing caps, in order to infuse and discharge fluid from the pod. The construction of the pod, as well as the temperature and pressure of the fluid injected into the pod may also vary as useful to facilitate brewing a particular beverage. Further, the various features of the embodiments disclosed herein can be used alone, or in varying combinations with each other and are not intended to be limited to the specific combination described herein. Thus, the scope of the claims is not to be limited by the illustrated embodiments.

Figure 1:
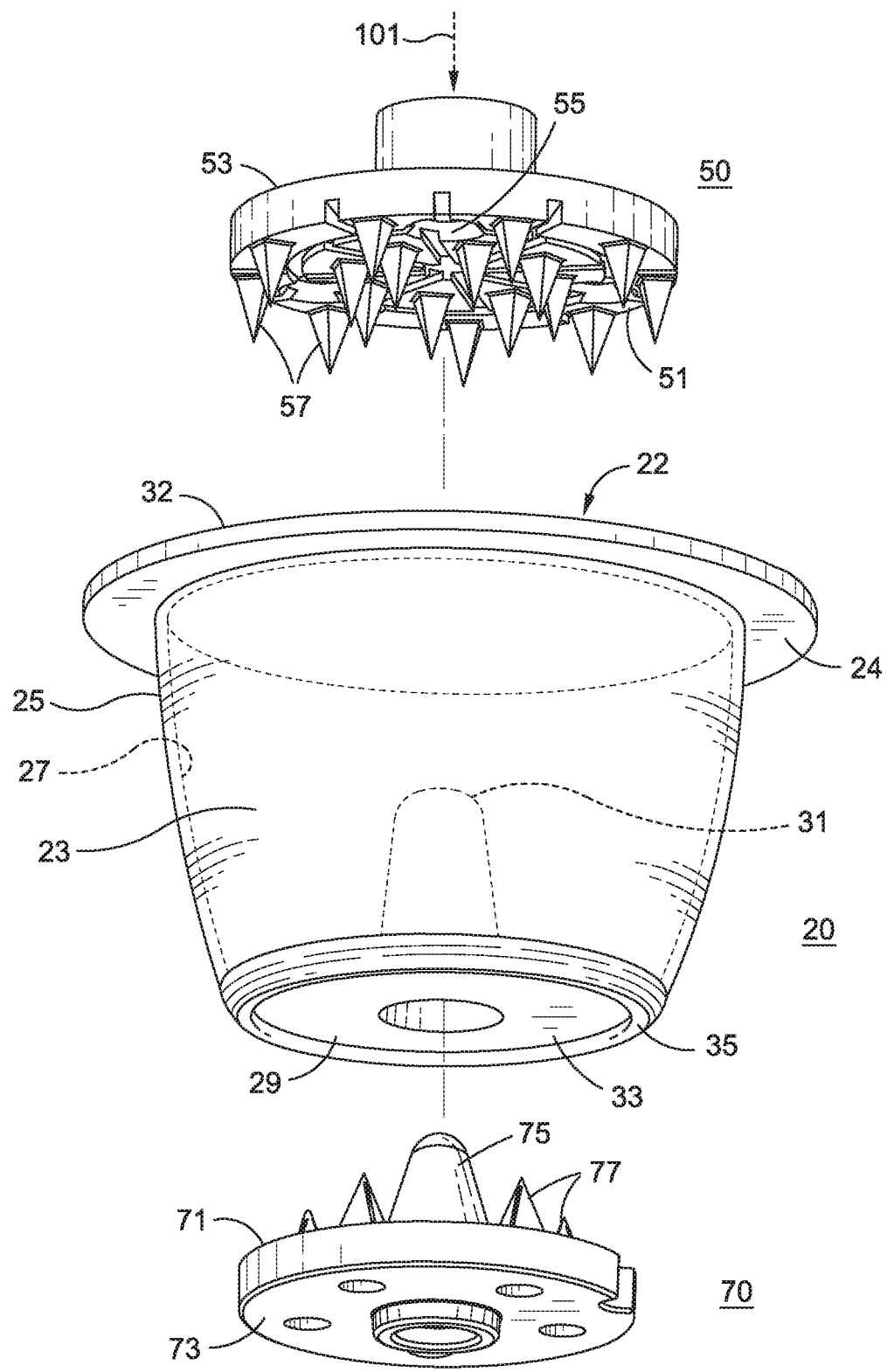
FIG. 1 is an exploded perspective view of an exemplary disposable pod, inflow puncturing cap, and outflow puncturing cap, according to the present invention.

Referring to the drawings, FIG. 1 illustrates an exemplary disposable pod 20, an inflow puncturing cap 50, and an outflow puncturing cap 70, in accordance with the present invention. The pod 20 may include a variety of different solutes, such as coffee, espresso, cappuccino, soluble milk, soluble chocolate, etc., sealed with the pod body 23. The pod top 22 defines a pod top surface 32 and a pod top rim 24.

Referring to FIG. 2, the pod body 23 defines sidewalls 25 which define a concave inner surface 27, and a pod base 29. The pod base 29 defines a pod lower surface 33 and a pod base rim 35, extending about the pod lower surface 33 intermediate the pod lower surface 33 and the sidewalls 25. The pod base 29 further defines an inward protrusion 31, which facilitates alignment of the pod 20 with the outflow puncturing cap protrusion 75.

The pod top surface 32 is preferably formed of a foil or other material that seals the pod 20 for storage, but permits puncturing by the inflow puncturing cap spikes 57 to allow infusion of fluid into the pod 20.

As explained further below, the pod body 23 is formed of materials such as polypropylene, which, in specified thicknesses, will allow puncturing by the outflow puncturing cap 70 when the pod 20 swells in response to infusion of a pressurized heated fluid. In one embodiment, the pod body 23 is approximately 900 microns thick and the solvent fluid is heated to a temperature of approximately 90° C., and pressurized to approximately 217 psi.

Referring to FIGS. 1 and 3, the inflow puncturing cap 50 is illustrated. The inflow puncturing cap 50 includes a first surface 51 and a second surface 53. The first surface 51 defines a plurality of inflow puncturing cap spikes 57, extending therefrom. The inflow puncturing cap spikes 57 are effective to puncture the pod top surface 32, as described further below.

The inflow puncturing cap 50 further includes a plurality of solvent fluid receiving conduits 55 extending therethrough. The first surface 51 further defines a plurality of fluid distribution conduits 58, extending from the fluid receiving conduits 55 across the first surface 51. The fluid distribution conduits 58 are each in fluid communication with at least one of the fluid inflow cap fluid receiving conduits 55, to facilitate distribution of the solvent flow 101 across the pod top surface 32.

Referring to FIGS. 1 and 4, an output puncturing cap 70 is shown to include a first surface 71 and a second surface 73. A plurality of outflow puncturing cap spikes 77 extend from the first surface 71. In the presently preferred embodiment, the outflow puncturing cap spikes 77 define a spike internal conduit 79 extending therethrough. The spike internal channels 79 define a spike fluid entry port 81 and spike fluid discharge port 83.

In one embodiment the outflow puncturing cap 70 further defines an outflow puncturing cap residual fluid discharge conduit 84 for receiving fluid flow discharged from the pod 20 through the pod fluid discharge ports formed in the pod lower surface 33, after being punctured by the outflow puncturing cap spikes 77.

As described further below, when the outflow puncturing cap spikes 77 puncture the pod lower surface 33, fluid may be discharged from the pod 20 through the spike internal conduits 79. Additional fluid is released through the resulting punctures in the pod lower surface 33 may be discharged through the residual conduit 84 formed in the outflow puncturing cap 70. The spike internal conduits 79 and residual discharge conduit 84 are each in fluid communication with an outflow puncturing cap housing fluid discharge conduit 86, as further shown at FIGS. 6C and 7E.

Figure 2A:
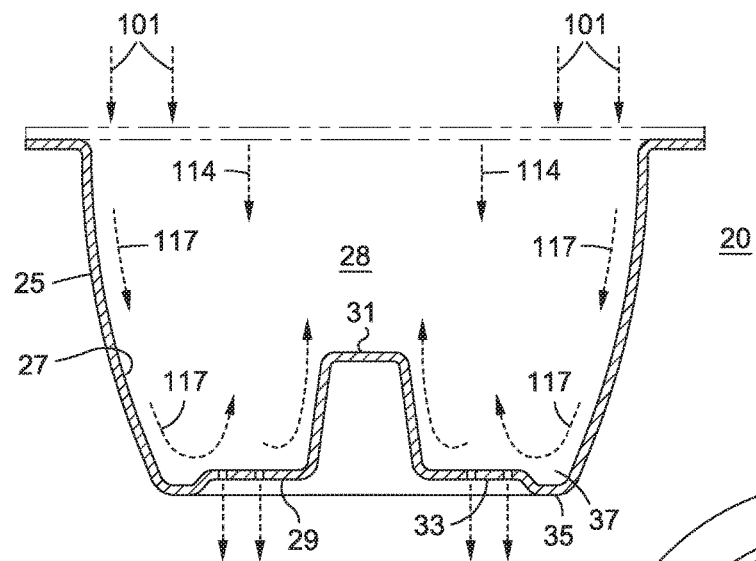
FIG. 2A is a side view of the disposable pod depicting fluid flow through the pod.
Figure 2B:
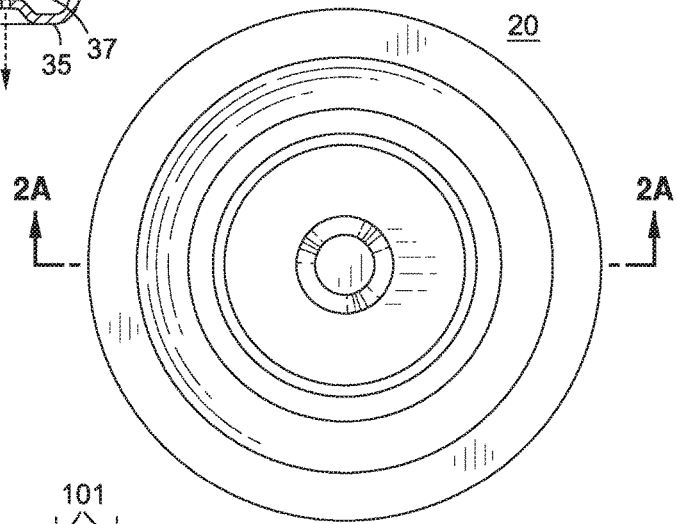
FIG. 2B is a top view of the disposable pod, with the top removed.
Figure 2C:
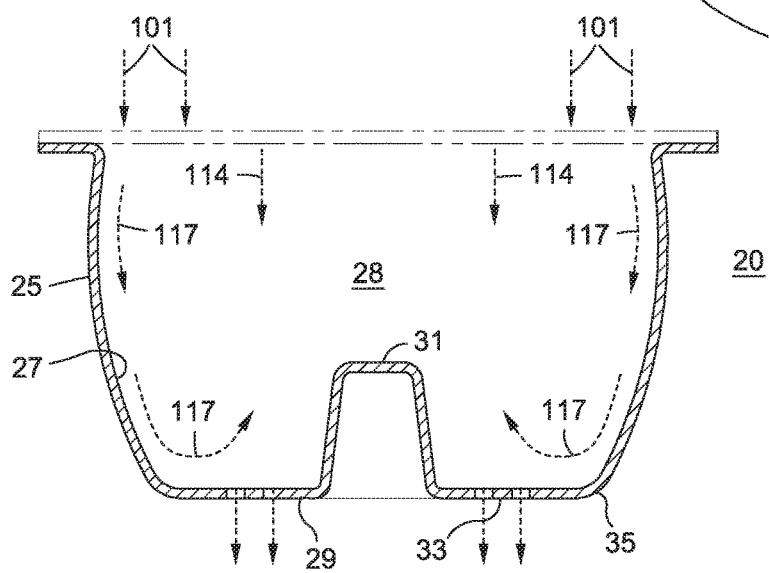
FIG. 2C is a side of the disposable pod after the inflow of heated, pressurized fluid has caused bulging of the pod sidewalls and the pod lower surface.
Figure 3A:
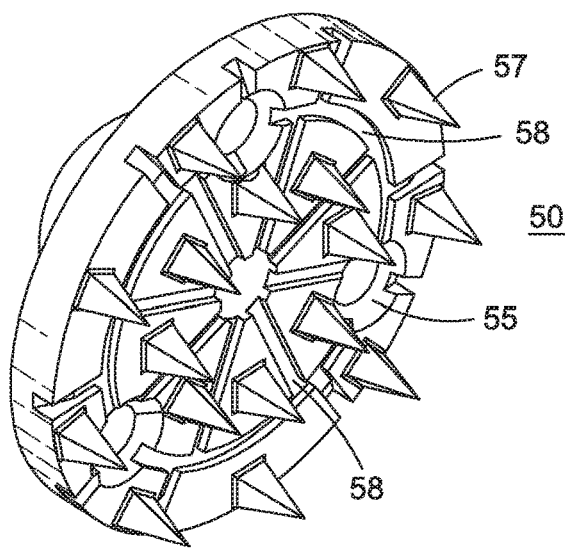
FIG. 3A is a front perspective view of an exemplary inflow puncturing cap.
Figure 3B:
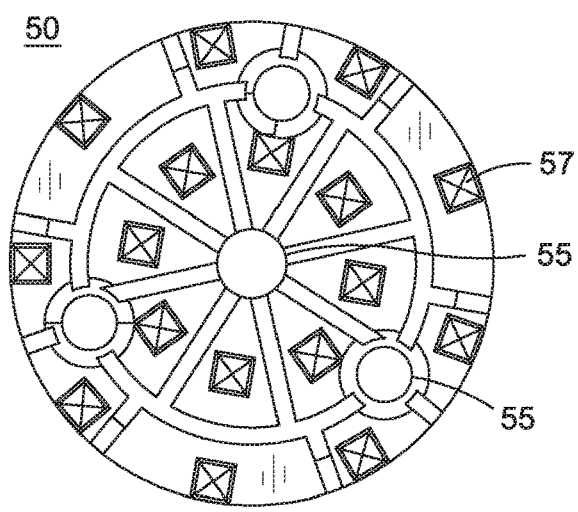
FIG. 3B is a front view of the inflow puncturing cap.
Figure 3C:
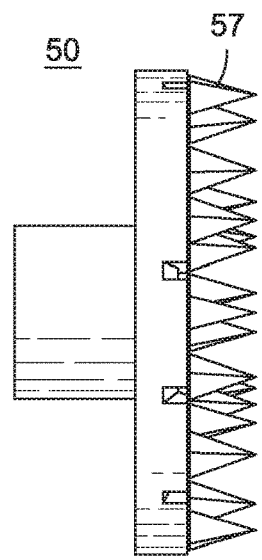
FIG. 3C is a side view of the inflow puncturing cap.
Figure 3D:
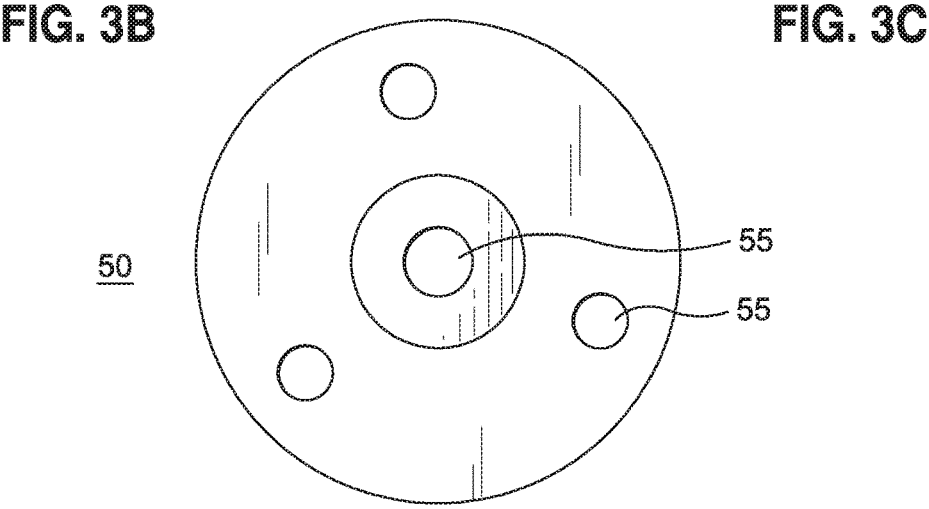
FIG. 3D is a bottom view of the inflow puncturing cap.

Referring to FIGS. 2A, 2B, and 2C, fluid flow into and through the pod 20 is further illustrated. As shown at FIG. 2A, solvent flow 101 enters the pod 20 through apertures formed by the inflow puncturing cap spikes 57. Fluid flow within the pod 20 includes, inter alia, a downward fluid flow 114 and redirected fluid flow 117. The redirected fluid flow 117 is redirected by the shape of the concave inner surface 27 to flow at angle downwardly, along the concave inner surface 27, until the fluid flow reaches a recess area 37, at which point the redirected fluid flow 117 is redirected upwardly and across the pod interior, intersecting other flows through the pod 20 such as the downward fluid flow 114 and flows about the protrusion 31. The redirection of the fluid flow, and intersection of other fluid flows is useful to facilitate the mixture of the solute and solvent within the pod 20. In practice, the shape of the sidewalls 25 and the shape of the recess 37, in conjunction with fluid temperature and pressure levels, have been found to be cooperative to eliminate static flow areas within the pod 20 wherein the solvent and solute do not mix. The intersection of the redirected fluid flow 117 and other flows within the pod 20, such as the downward fluid flow 114 has been found to eliminate any dominant fluid flow patterns within the pod 20 to further facilitate full mixture of the solute and solvent within the pod 20.

After fluid infusion into the pod 20 has occurred, the interior of pod 20 effectively serves as brewing chamber 28, wherein coffee or other beverages may be brewed prior to puncture of the pod lower surface 33 and fluid discharge from the pod 20.

An important feature of the present invention relates to the ability of the present invention to facilitate full brewing of a beverage within the brewing chamber 28, before the pod lower surface 33 is punctured by the outflow puncturing cap spikes 77.

Referring to Figures to 2A and 2C, it can be noted that the original shape of the pod, as shown at FIG. 2A, is modified by the injection of heated, pressurized fluid, as shown at FIG. 2C. A comparison of FIGS. 2A and 2C shows that upon injection of heated, pressurized fluid into the pod 20, the sidewalls 25 may expand, or attempt to expand outwardly and the pod lower surface 33 expands downwardly, to be substantially flat, as shown in FIG. 2C.

As explained further below, the pod lower surface 33 also expands to be substantially flat, causing the pod lower surface 33 to abut against the outflow puncturing cap spikes 77, resulting in puncturing of the pod lower surface 33 and discharge of fluid from the pod 20.

FIGS. 5 and 6A-6C illustrate an exemplary translation mechanism 100, operative to receive pod 20 in a pod receiving area 103. As further shown at FIGS. 5, 6A-6C and 7A-7E, the translating mechanism 100 includes a translation mechanism housing 113, inflow puncturing cap receiving apparatus 105 and an outflow puncturing cap housing 104, disposed within the translation mechanism housing 113. The translation mechanism 100 further includes translating handle 110 and the linkage assembly 112, coupled to the translating handle 110, and inflow puncturing cap receiving apparatus 105, and operative to translate the inflow puncturing cap 105 between a first position, wherein the inflow puncturing cap spikes are disposed outside of the pod 20 (See FIG. 7A) and a second position wherein the inflow puncturing cap spikes 57 have punctured the pod top surface 32 and the pod top rim 24 abuts the pod seating surface 109 (See FIG. 7B).

Figure 6A:
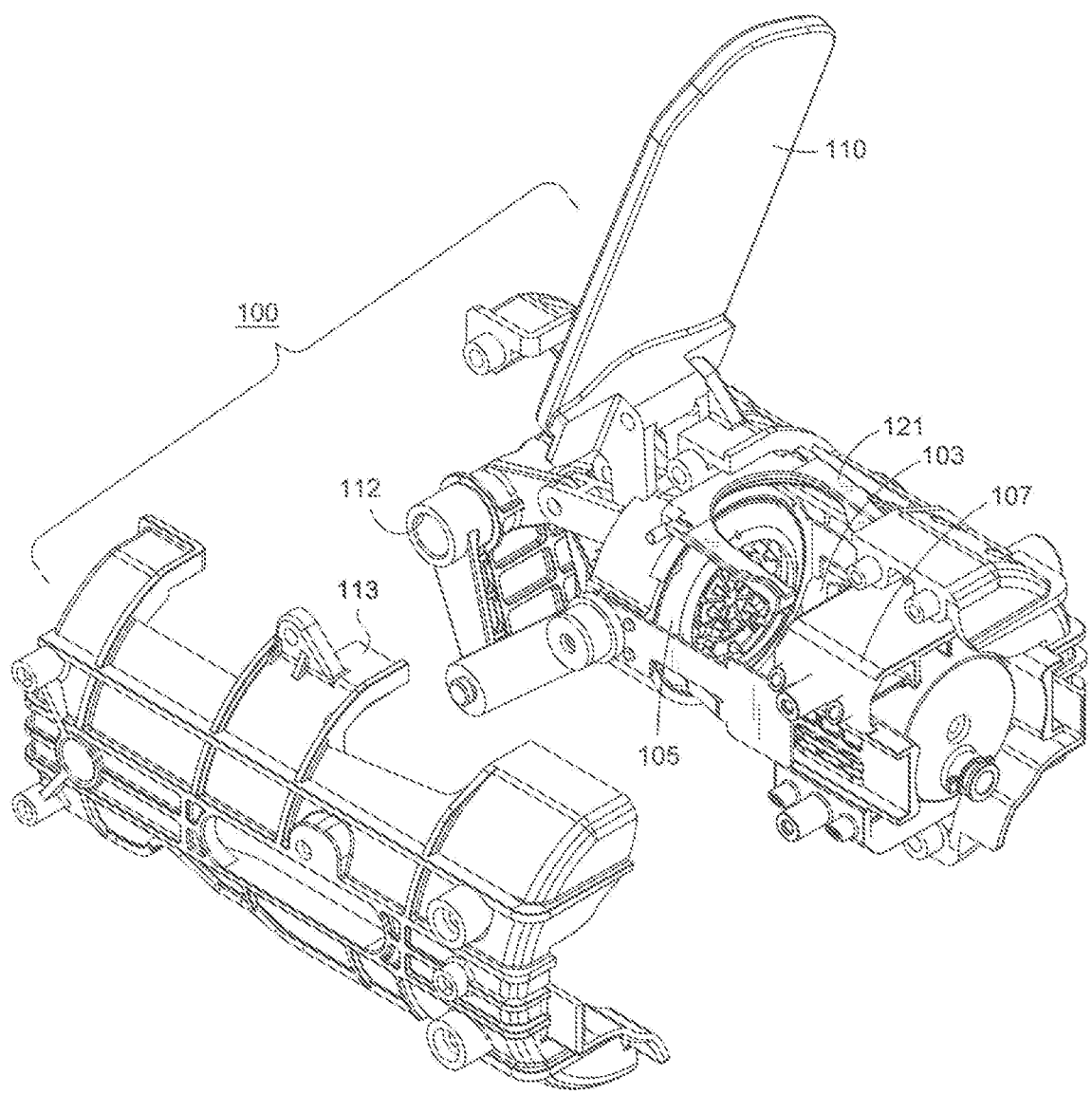
FIG. 6A is a side view of the translation mechanism with the translation mechanism housing separate to show internal portions of the translation mechanism.
Figure 6B:
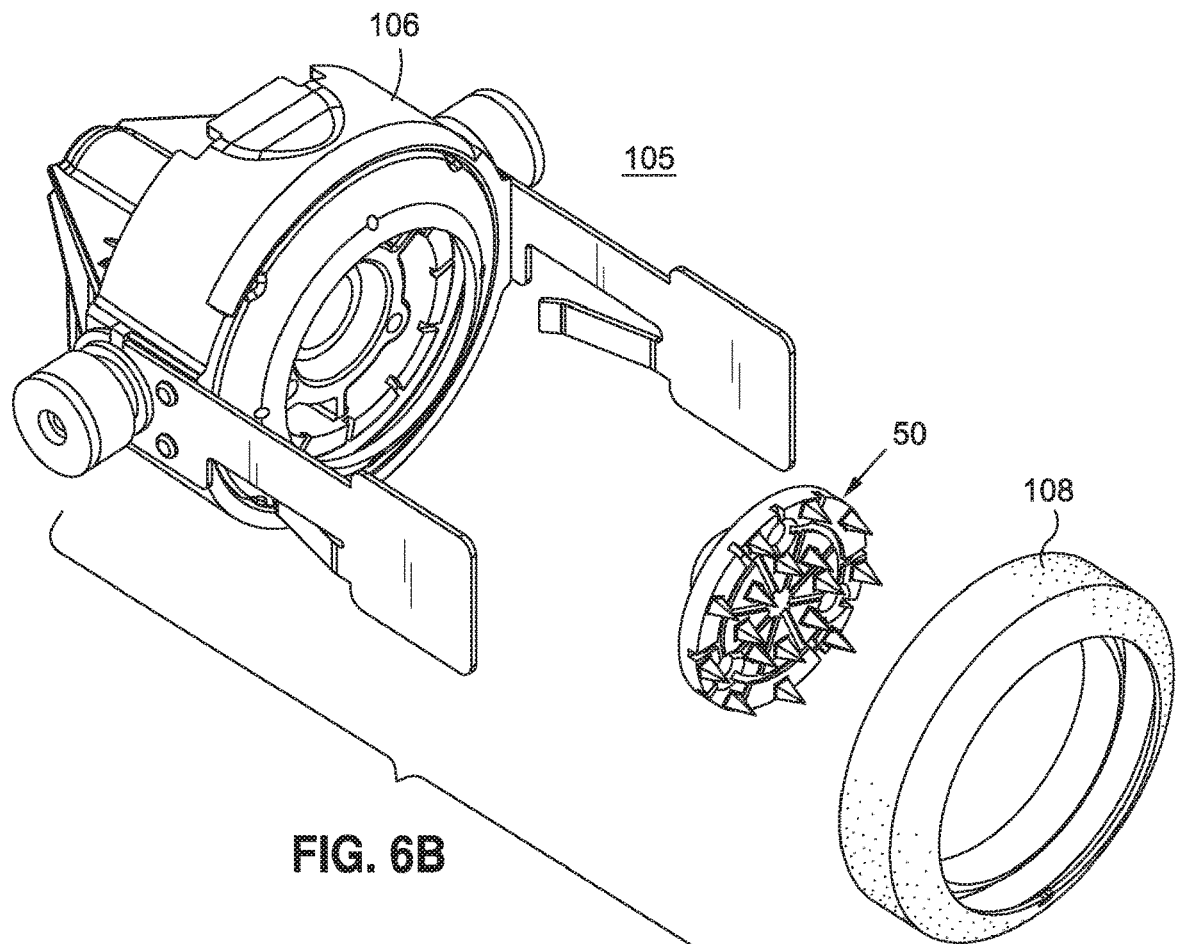
FIG. 6B is an exploded view of an exemplary inflow puncturing cap receiving apparatus.

FIG. 6B illustrates the translatable inflow puncturing cap receiving apparatus 105 for receiving and engaging the input flow puncturing cap 50. The inflow puncturing cap receiving apparatus 105 is also shown at FIG. 6A, in conjunction with the translation mechanism 100.

The inflow puncturing cap apparatus 105 includes an inflow puncturing cap housing 106 for receiving and supporting the inflow puncturing cap 50, and a collar 108, for securing the inflow puncturing cap 50 in place against the inflow puncturing cap housing 106.

Figure 6C:
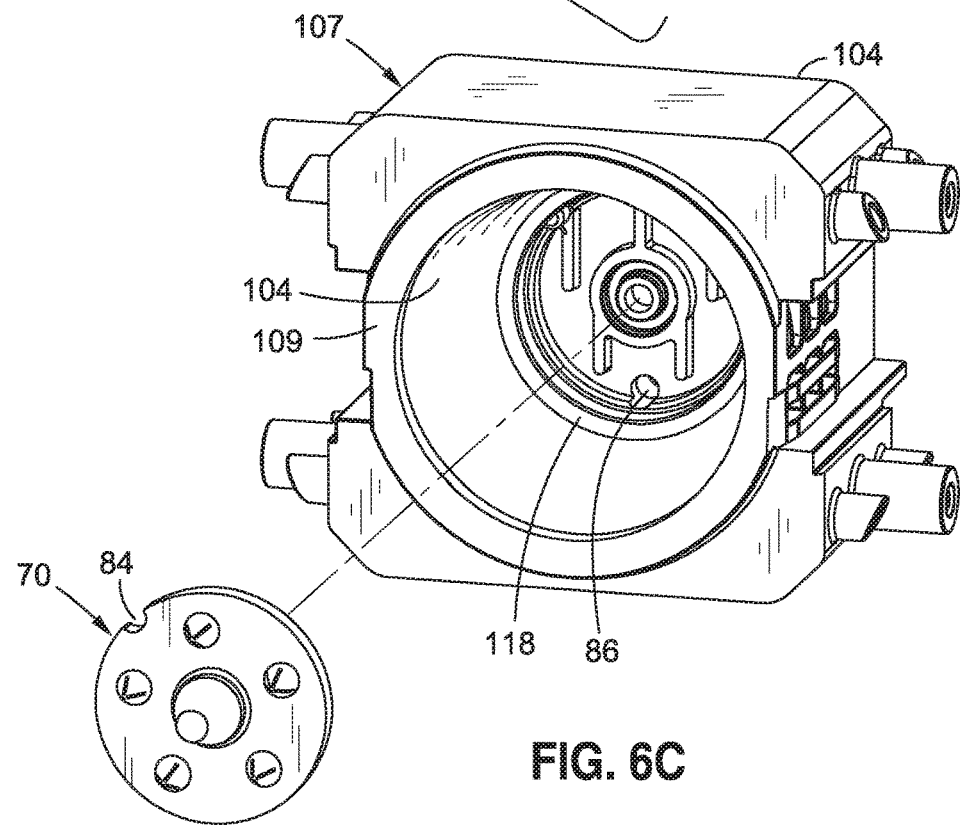
FIG. 6C is a front perspective view of an exemplary outflow puncturing cap housing.

FIG. 6C further illustrates the outflow puncturing cap housing 107. As shown therein, outflow puncturing cap housing 107 defines a surface 118, for receiving and supporting the outflow puncturing cap 70, and a well 104 for receiving the pod 20. The outflow puncturing cap housing 107 also defines a pod seating surface 109 for receiving and supporting the pod 20 along the pod top rim 24.

The outflow puncturing cap 70 further defines an outflow puncturing cap residual fluid discharge conduit 84, formed through the outflow puncturing cap 70. The outflow puncturing cap discharge conduit 84 is formed to receive fluid discharge from the pod 20 that does not enter the spike internal channels, but rather is discharged about the punctures formed after penetration of the pod lower surface 33 by the outflow puncturing cap spikes 77.

Figure 7A:
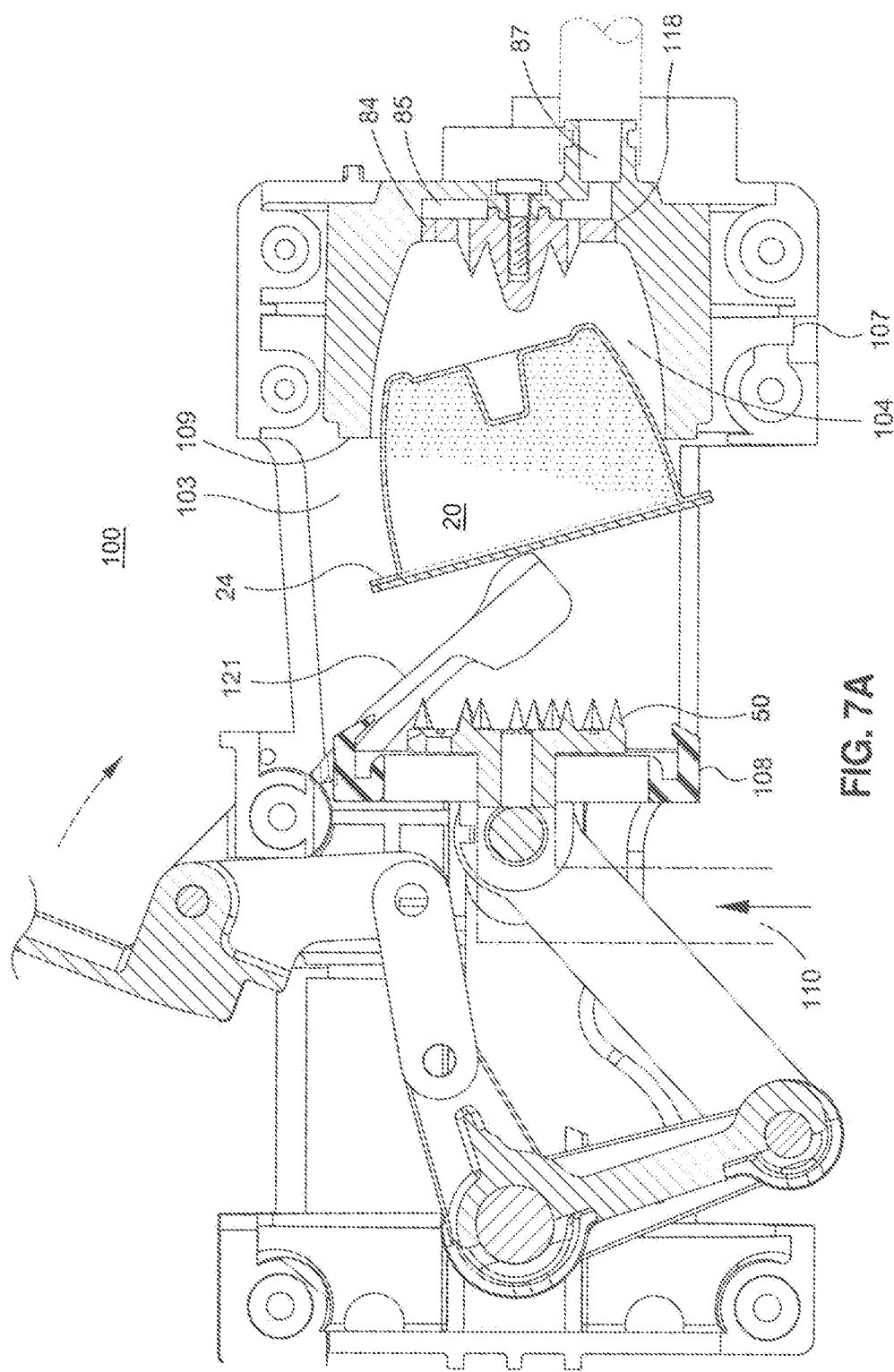
FIG. 7A is a side sectional view of the translation mechanism showing a pod placed therein.
Figure 7B:
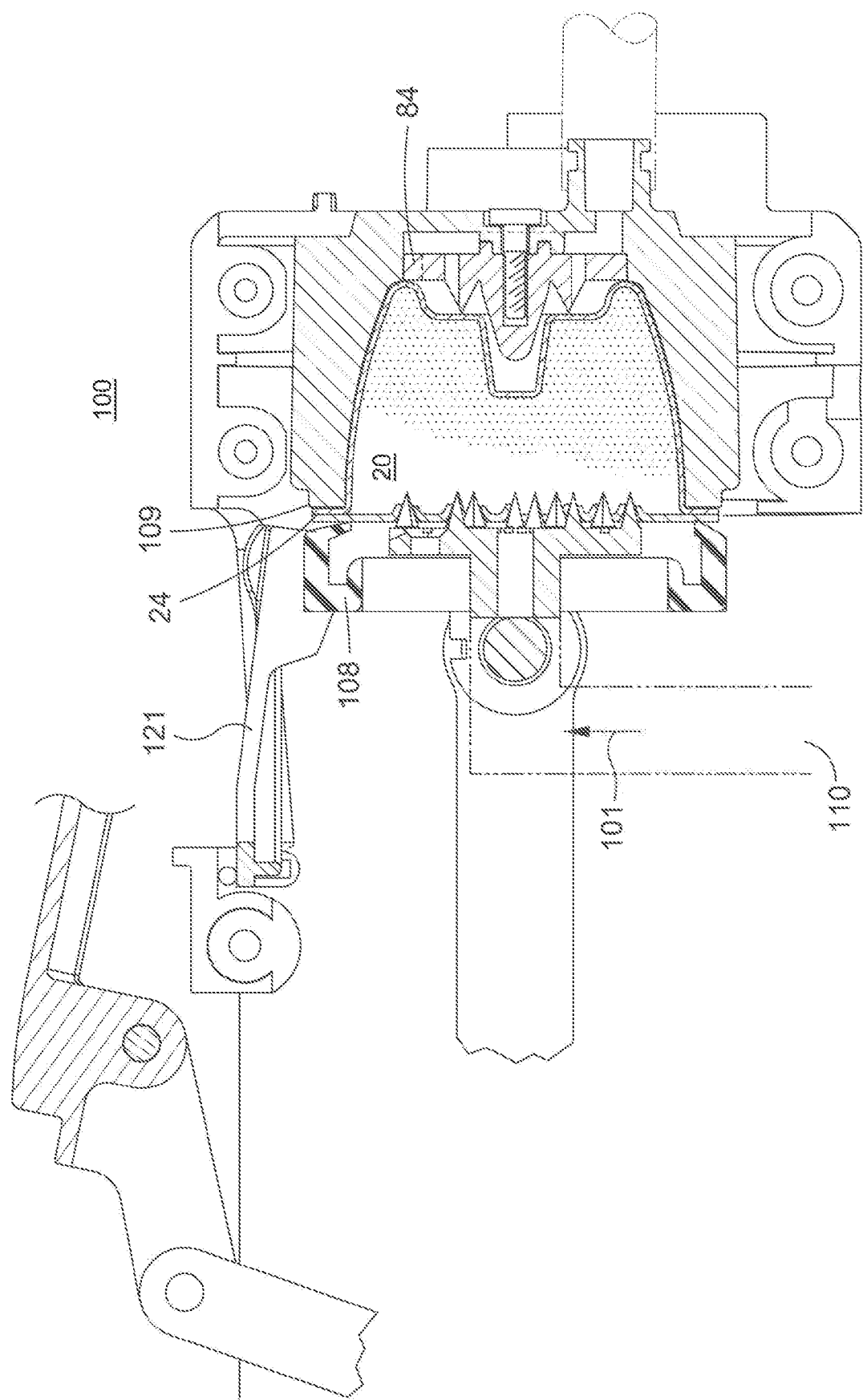
FIG. 7B is a side sectional view of the translation mechanism wherein the pod is translated into a position with the pod lower surface disposed proximate the outflow puncturing cap.
Figure 7D:
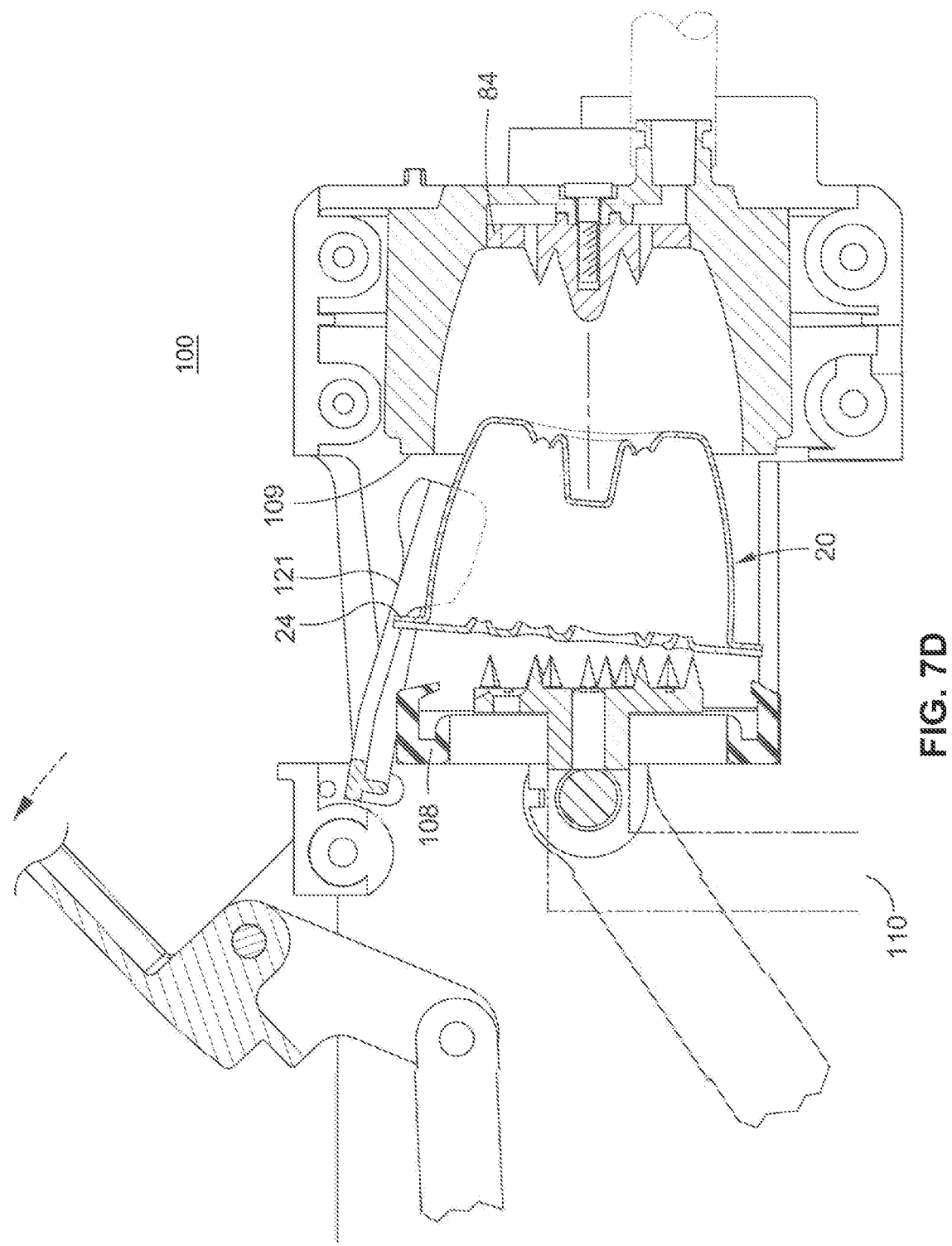
FIG. 7D is a side sectional view of the translation mechanism, showing the pod retracted from the outflow puncturing cap housing and disengaged from the inflow puncturing caps.

FIGS. 7A-7E illustrate the process by which the pod 20 is inserted into the translating mechanism 100 and punctured by the inflow puncturing cap 50 and the outflow puncturing cap 70. FIG. 7A shows the pod 20 inserted into the translating mechanism pod receiving area 103. At shown at FIG. 7A, the insertion of pod 20 within the pod receiving area 103 deflects the resilient guide member 121 downwardly such that the pod top 22 slides along downwardly, along the upper surface of the guide member 121 and towards well 104. As the inflow puncturing cap translates towards the well 104, the resilient guide member 121 is urged upwardly, beyond pod top rim 24 by abutting contact with collar 108 of the translating inflow puncturing receiving apparatus 105 (See FIG. 6B). As shown at FIG. 7D, the resilient guide member 121, having been raised to a position beyond the perimeter of the pod top rim 24, translates over the pod top rim 24 as the inflow puncturing cap 50 is retracted, and abuts against the sidewalls 25, urging the pod 20 downwardly, and out of engagement with the inflow puncturing cap spikes 57.

FIG. 7B shows the inflow puncturing cap 50 in a fully translated position, wherein the pod 20 is fully seated within the outflow puncturing cap housing 107, with the pod-base rim 35 resting upon the outflow puncturing cap first surface 71 and the pod lower surface 33 disposed proximate the outflow puncturing cap spikes 77.

FIG. 7C illustrates a similar configuration, after the flow of pressurized fluid into the pod 20 causes the pod lower surface 33 to expand and press against the outflow puncturing cap spikes 77, causing punctures in the pod lower surface 33 of the pod 20. This allows the brewed fluid to be discharged from the pod 20

During retraction the inflow puncturing cap 50 initially remains attached to the pod 20, as a result of frictional engagement between the inflow puncturing cap spikes 57 and the pod top surface 32. FIG. 7D shows the later stage of retraction of the inflow puncturing cap from the outflow puncturing cap housing 107, wherein, as a result of downward pressure on pod 20 by guide member 121, the pod 20 is disassociated from the inflow puncturing cap spikes 57.

Figure 7E:
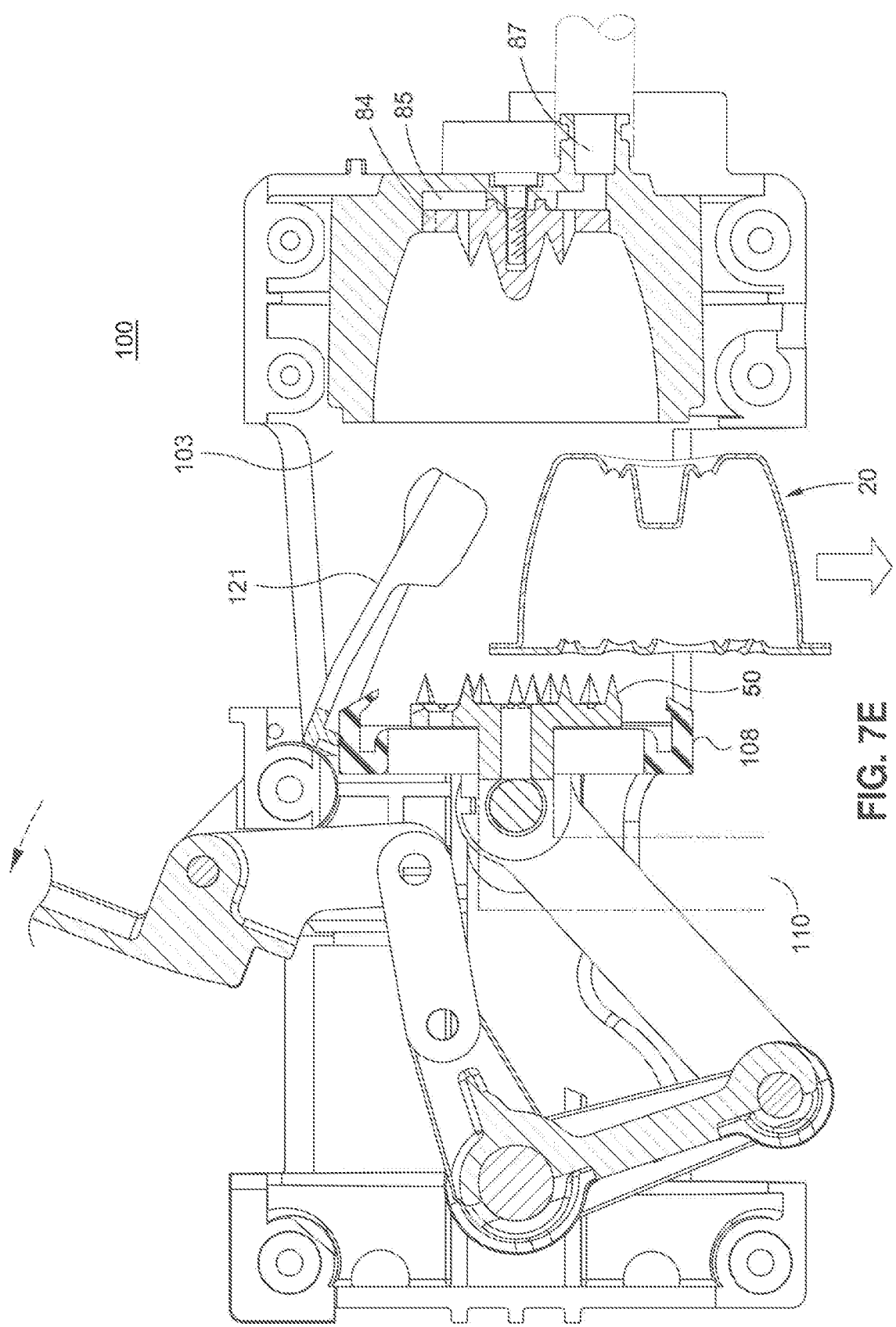
FIG. 7E is a side sectional view of the translation mechanism, showing the pod being discharged from the translating mechanism.

FIG. 7E illustrates a further retraction of the inflow puncturing cap 50 which, in combination with the downward pressure of the resilient guide retention member 121, causes the pod 20 to fully disengage from the inflow puncturing cap spikes 57, and be discharged from the translating mechanism 100.

As it will be apparent to those of ordinary skill in the art, the stiffness of the guide member 121, the size and shape of the inflow puncturing cap spikes 57 and the stiffness/thickness of the pod top surface 22 are selected such that the frictional engagement between the pod 20 and the inflow puncturing cap spikes 57 is such as to facilitate retraction of the pod 20 from the outflow puncturing cap housing 107, but still allows the downward pressure of resilient guide/retention member 121 to overcome such frictional engagement as the inflow puncturing cap 50 translates to a fully retracted position.

Figure 4A:
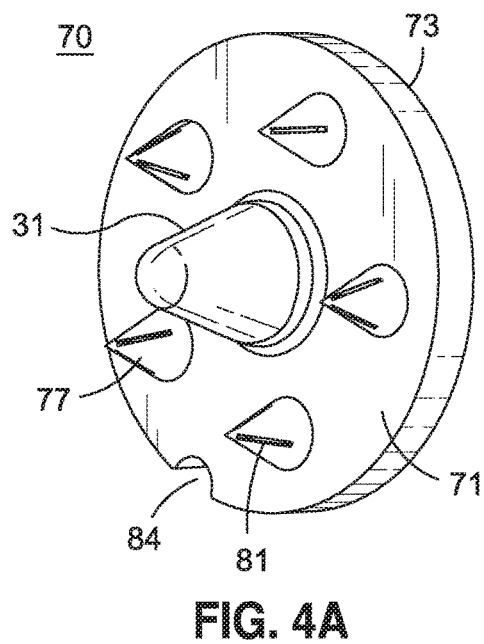
FIG. 4A is a front perspective view of an exemplary outflow puncturing cap.
Figure 4B:
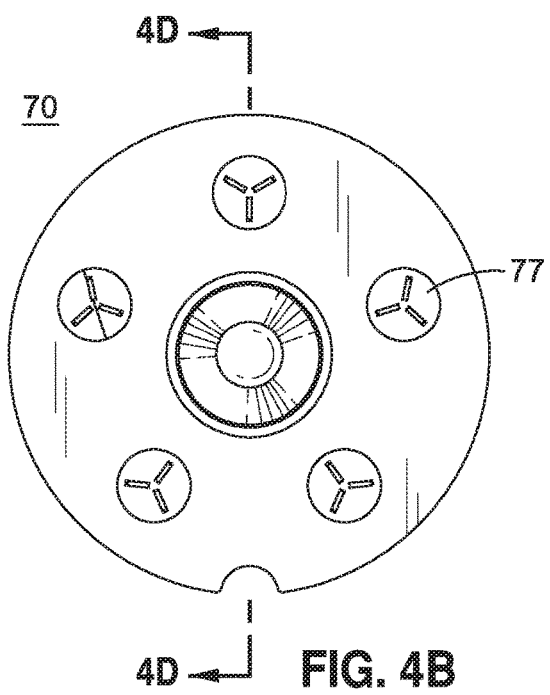
FIG. 4B is a front view of the outflow puncturing cap.
Figure 4C:
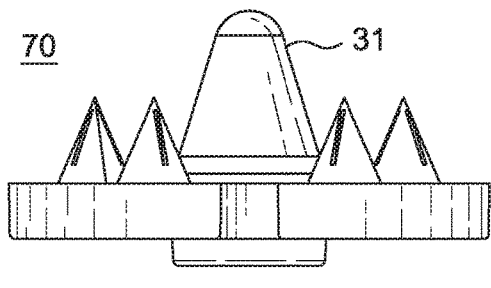
FIG. 4C is a side view of the outflow puncturing cap.
Figure 4D:
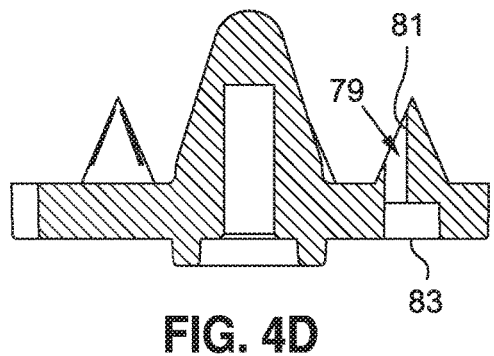
FIG. 4D is a further side view of the inflow puncturing cap, showing fluid channels formed in the spikes.
Figure 4E:
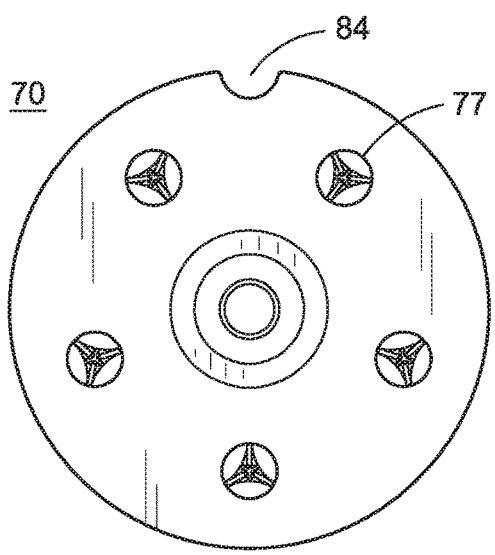
FIG. 4E is a bottom view of the outflow puncturing cap.
Figure 5:
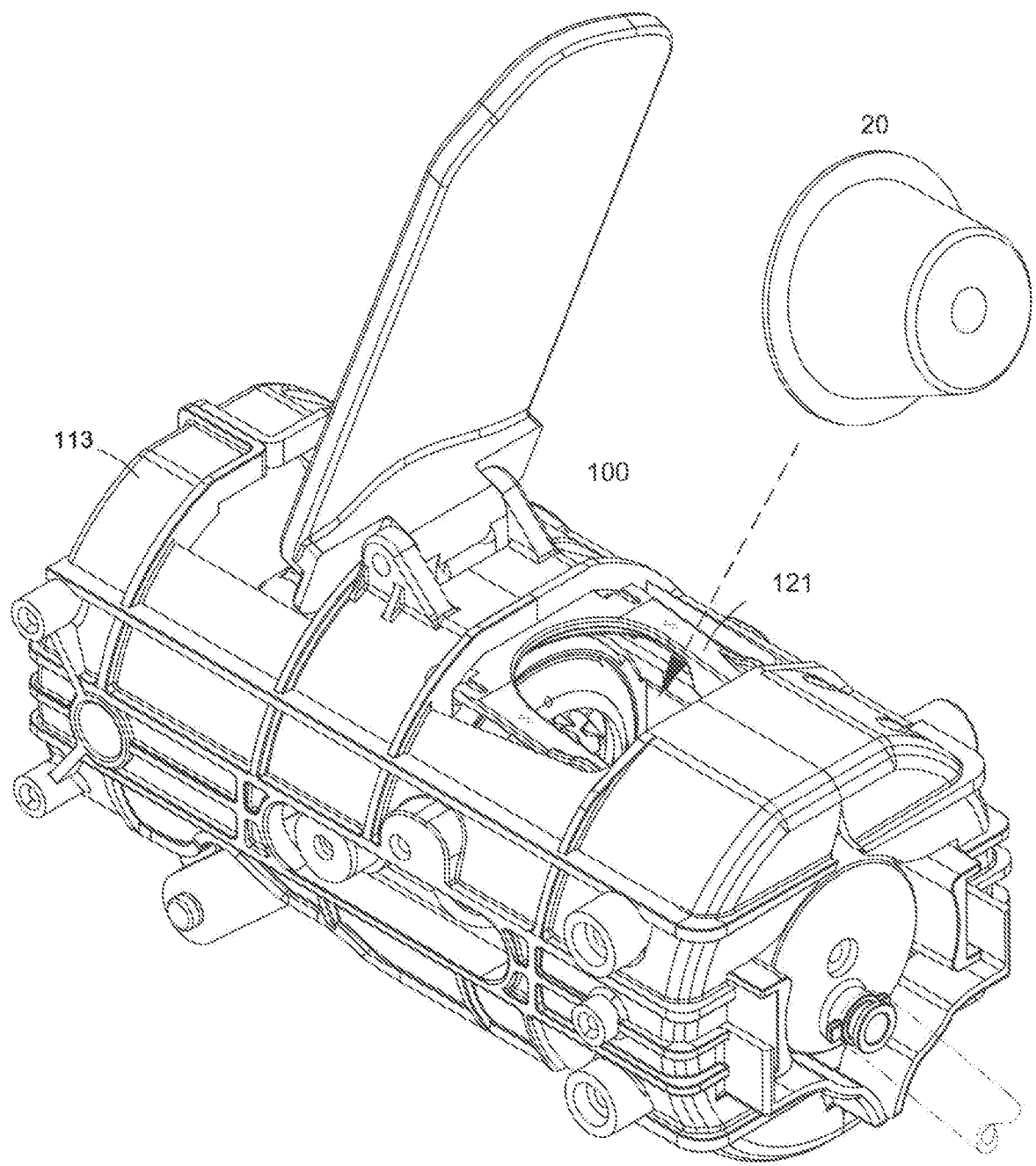
FIG. 5 is front perspective view of an exemplary translation mechanism.

FIGS. 7A-7E also illustrate the manner in which fluid discharged from the pod 20 is communicated to outflow puncturing cap conduit 85 and outflow puncturing cap housing discharge port 87. As also shown at FIG. 4D, fluid discharged from the pod 20 via the spike internal conduit 79, enters the spike internal conduit 79 via the spike fluid entry port 81 and is discharged from the spike internal conduit 79 via the spike fluid discharge port 83, whereupon the fluid flow enters outflow puncturing cap housing conduit 85, and is discharged from the outflow puncturing cap housing 107 via outflow puncturing cap housing discharge port 87.

Similarly, fluid discharged from the pod 20, that does enter the spike internal conduit 79, may be discharged through apertures formed in the pod lower surface 33 by the outflow puncturing cap spikes 77, and also enters outflow puncturing cap housing conduit 85, which communicates the flow to outflow puncturing cap housing discharge port 87.

Figure 8A:
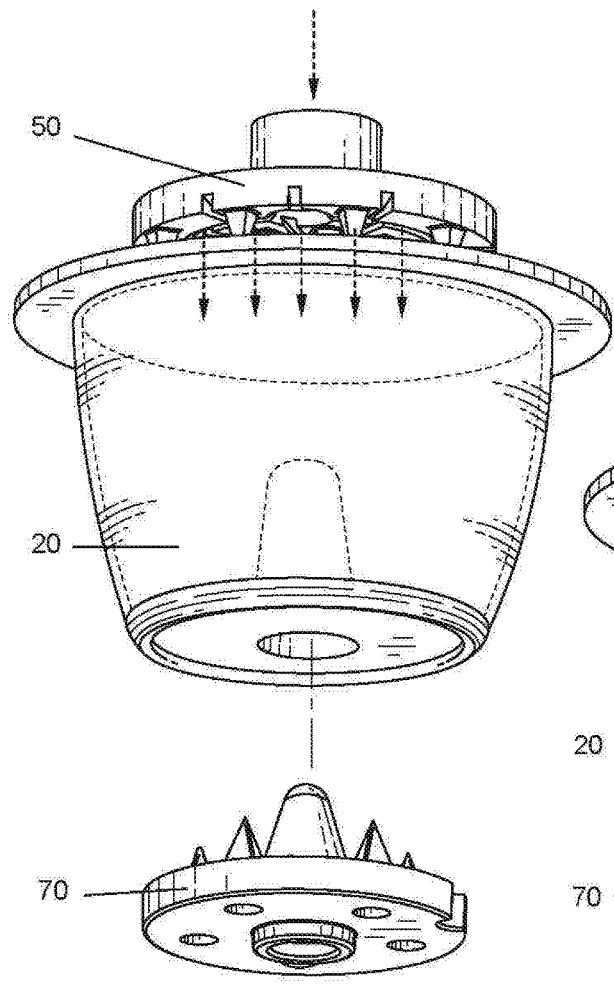
FIG. 8A is a perspective view of the pod in a pre-fluid infusion state.

FIG. 8A further illustrates the process of fluid flow into the pod 20. As shown at FIG. 8A, fluid enters the pod 20 when the inflow puncturing cap 50 translates to a position where it presses against the pod top 22, puncturing the pod top and allowing fluid flow into the pod 20 via the punctures.

Figure 8B:
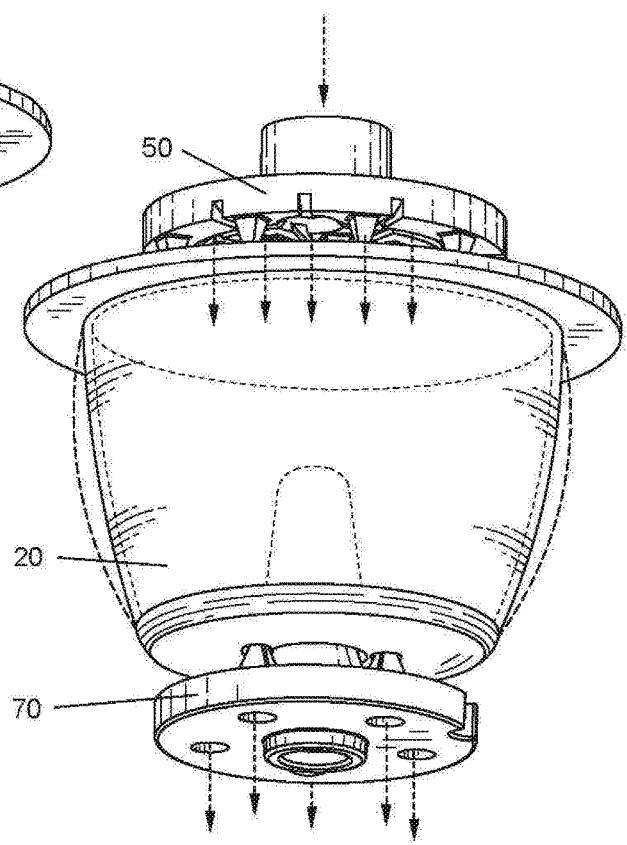
FIG. 8B is a side view of the pod in a post fluid infusion state after, the pod lower surface has been punctured.

FIG. 8B illustrates the expansion of the pod 20 in response to the introduction of heated, pressurized fluid into the pod, causing a bulging of the sidewalls 25 and the pod lower surface 33. The bulging of the pod lower surface 33 causes the pod lower surface 33 to extend into abutting engagement with the outflow puncturing cap spikes 77, causing puncture of the pod lower surface 33 by the outflow puncturing cap spikes 77. At that point, fluid is discharged from the pod 20 via the spike channels, and through the outflow puncturing cap residual discharge conduit 84, as described above.

As indicated above, the temperature and pressure of the solvent fluid inflow may be varied in accordance a preferred brewing period and brewing temperature of a particular beverage. As will be apparent to those skilled in the art, the thickness and thermoplastic material characteristics of the material used to form the pod base may also be varied so that the pod base will puncture once subjected to a predetermined fluid inflow pressure, fluid inflow, and inflow temperature, for a desired brewing period. Similarly, the fluid inflow pressure may be varied to facilitate complete mixture of the fluid inflow solvent and the pod solute, during the preferred brewing period.

These and other modifications and variations will be apparent to those skilled in the art to facilitate use of the present invention in relation to preparation of variety of different beverages. As such, the present invention is not intended to be limited to the pressure, temperature, brewing period or pod base material used in relation to the embodiments disclosed herein.

What is claimed is:

1. A system for mixing and dispensing a beverage comprising:
   a) a disposable pod containing a solute therein, the pod comprising a pod top defining a pod top surface, a pod top rim and a pod body defining sidewalls having a concave inner surface and a pod base, the pod base defining, a pod lower surface and a base outer rim extending about the pod lower surface and extending from the pod lower surface to the sidewalls, the concave inner surface extending along an axial length of the pod from the pod top rim to the pad base;

b) an inflow puncturing cap having opposing first and second inflow puncturing cap surfaces and inflow puncturing cap fluid receiving conduits extending therethrough, the first inflow puncturing cap surface defining a plurality of inflow puncturing cap spikes extending therefrom, the first inflow puncturing cap surface further defines a plurality of inflow puncturing cap fluid distribution conduits extending from each of the inflow puncturing cap fluid receiving conduits across and in the first inflow puncturing cap surface;

c) an outflow puncturing cap defining opposing first and second outflow puncturing cap surfaces, the first outflow puncturing cap surface defining a plurality of outflow puncturing cap spikes extending therefrom, the outflow puncturing cap spikes having a spike internal channel extending therethrough, the spike internal channel defining a spike fluid entry port and a spike fluid discharge port; and d) a translation mechanism for receiving, and communicating a fluid solvent through the pod, the translation mechanism defining:
a translation mechanism housing;
a translatable inflow puncturing cap receiving apparatus disposed within the translation mechanism housing, the inflow puncturing cap received in and supported by the inflow puncturing cap receiving apparatus; and
an outflow puncturing cap housing disposed within the translation mechanism housing, the outflow puncturing cap second surface received in and supported by the outflow puncturing cap housing, the outflow puncturing cap housing defining a pod seating surface located so that the pod lower surface is disposed proximate the outflow puncturing cap spikes when the pod top rests against the pod seating surface, and an outflow puncturing cap housing discharge conduit through which discharge fluid from the outflow puncturing cap housing may flow when the translation mechanism is in a second position;

e) the translation mechanism housing further defining a pod translation assembly having a mechanical linkage coupled to the inflow puncturing cap receiving apparatus, the inflow puncturing cap receiving apparatus translating along a longitudinal axis between a first position wherein the inflow puncturing cap spikes are disposed outside of the pod and the second position wherein the inflow puncturing cap spikes puncture the pod top surface and the pod lower surface is disposed proximate the outflow puncturing cap spikes, and wherein when the inflow puncturing cap receiving apparatus is in the first position the inflow and outflow puncturing caps are separated a distance sufficient to allow the pod to be inserted laterally between the inflow and outflow puncturing caps and placed with the pod top against the pod seating surface without the inflow puncturing cap spikes or the outflow cap puncturing spikes puncturing the pod;

f) the translation mechanism further defining a translation mechanism solvent infusion port, in fluid communication with the inflow puncturing cap fluid receiving conduits and inflow puncturing cap fluid distribution conduits in the first position, and in further fluid communication with an inside of the pod in the second position through openings in the pod lid formed by the inflow puncturing cap spikes; and g) the pod lower surface being deformable in response to receipt of the heated, pressurized solvent so as to expand and press against the outflow puncturing cap spikes, causing the outflow puncturing cap spikes to puncture the pod lower surface, enabling fluid discharge from the pod.

2. The system as recited in claim 1 wherein the puncture of the pod top by the inflow puncturing cap spikes defines a plurality of pod fluid entry ports into the pod through the pod top surface.

3. The system as recited in claim 2 wherein the pod defines a brewing chamber within the pod wherein the solvent fluid entering the pod via the pod entry ports mixes with the pod solute within the pod, during a brewing period.

4. The system as recited in claim 1 wherein fluid within the pod is discharged through the outflow puncturing cap spike internal channel.

5. The system as recited in claim 4 wherein the outflow puncturing cap housing fluid discharge conduit is in fluid communication with the spike internal channel.

6. The system as recited in claim 5 wherein the pod base is formed of materials selected to be penetrable by the outflow puncturing cap spikes when subjected to a desired solvent fluid temperature and pressure level.

7. The systems as recited in claim 6 wherein the puncture of the pod lower surface by the outflow puncturing cap spikes defines a plurality of pod fluid discharge ports in the pod lower surface.

8. The system as recited in claim 7 wherein the outflow puncturing cap defines an output puncturing cap residual fluid discharge conduit for receiving fluid discharged from the pod through the pod fluid discharge ports, the residual fluid discharge conduit being in fluid communication with the outflow puncturing cap housing fluid discharge conduit.

9. The system as recited in claim 6 wherein the pod lower surface is formed to be proximately 900 micron thickness.

10. The system as recited in claim 6 wherein the pod lower surface is formed of a polypropylene.

11. The system as recited in claim 10 wherein the pod top is approximately 50 micron thick.

12. The system as recited in claim 6 wherein the solvent fluid is heated to a temperature of approximately 90° C. and the pressurized to approximately 217 psi.

13. The system as recited in claim 6 wherein the pod base is formed to define concave sidewalls and a pod body defines a pod recess area within the pod body intermediate the pod sidewalls and the pod lower surface, the pod sidewalls and recess area cooperative to redirect fluid flow from the pod sidewalls inwardly and upwardly across within the pod, such that a redirected flow path intersects downward fluid flow paths into the pod body, to enhance mixing of the fluid solvent and the pod solute within the pod.

14. The system as recited in claim 6 wherein the translation mechanism translates the inflow puncturing cap towards the pod top surface until the pod top rim is seated on the pod seating surface, with the pod lower surface being disposed above the outflow puncturing cap spikes.

15. The system as recited in claim 1 wherein the pod base rim extends vertically below the pod lower surface.

16. A system for mixing and dispensing a beverage comprising:
a) a disposable pod containing a solute therein, the pod comprising a pod top defining a pod top surface, a pod top rim and a pod body defining sidewalls having a concave inner surface and a pod base, the pod base defining, a pod lower surface and a base outer rim extending about the pod lower surface, intermediate the pod lower surface and the sidewalls, the concave inner surface extending along an axial length of the pod from the pod top rim to the pod base;

b) an inflow puncturing cap having opposing first and second inflow puncturing cap surfaces and inflow puncturing cap fluid receiving conduits extending therethrough, the first inflow puncturing cap surface defining a plurality of inflow puncturing cap spikes extending therefrom, the inflow puncturing cap spikes having no internal fluid channels extending through a length of the inflow puncturing cap spikes the first inflow puncturing cap surface further defines a plurality of inflow puncturing cap fluid distribution conduits extending from each of the inflow puncturing cap fluid receiving conduits across and in the first inflow puncturing cap surface;

c) an outflow puncturing cap defining opposing first and second outflow puncturing cap surfaces, the first outflow puncturing cap surface defining a plurality of outflow puncturing cap spikes extending therefrom, the outflow puncturing cap spikes having a spike internal channel extending therethrough, the spike internal channel defining a spike fluid entry port and a spike fluid discharge port; and d) a translation mechanism for receiving, and communicating a fluid solvent through the pod, the translation mechanism defining:

a translation mechanism housing;

a translatable inflow puncturing cap receiving apparatus disposed within the translation mechanism housing and having a well configured to receive the pod body and the sidewall with the concave inner surface, the inflow puncturing cap received in and supported by the inflow puncturing cap receiving apparatus;

an outflow puncturing cap housing disposed within the translation mechanism housing, the second outflow puncturing cap surface, received in and supported by the outflow puncturing cap housing, the outflow puncturing cap housing defining a pod seating surface located so that a pod lower surface is disposed proximate the outflow puncturing cap spikes when the translation mechanism is in a second position; and an outflow puncturing cap housing discharge conduit in fluid communication with the outflow puncturing cap housing and through which discharge fluid from the outflow puncturing cap housing may flow when the translation mechanism is in the second position;

e) the translation mechanism housing comprising a pod translation assembly having a mechanical linkage coupled to the inflow puncturing cap receiving apparatus, for translating the inflow puncturing cap along a longitudinal axis between a first position wherein the inflow puncturing cap spikes are disposed outside of the pod and the second position wherein the inflow puncturing cap spikes puncture the pod top surface and the pod lower surface is disposed proximate the outflow puncturing cap spikes, and wherein when the inflow puncturing cap is in the first position the inflow and outflow puncturing caps are separated a distance sufficient to allow the pod to be inserted laterally between the inflow and outflow puncturing caps and placed in the outflow puncturing cap housing, the pod lower surface being deformable in response to receipt of the heated, pressurized solvent so as to expand and press against the outflow puncturing cap spikes, causing the outflow puncturing cap spikes to puncture the pod lower surface, enabling fluid discharge from the pod, the translation mechanism defining a translation mechanism solvent infusion port, in fluid communication with the inflow puncturing cap fluid receiving conduits, for communicating a heated, pressurized fluid solvent into the pod, after the pod top surface is punctured; and f) a pod resilient guide member attached to the translation mechanism, the guide member being displaceable upon insertion of a pod into the pod receiving area to abut against the pod top, to urge the pod towards the pod seating surface.

17. The system as recited in claim 16 wherein as the translation mechanism translates the input flow puncturing cap from the first position to the second position, the resilient guide member abuts against the input puncturing cap receiving apparatus and is urged upwardly thereby to a position above of the pod top.

18. The system as recited in claim 17 wherein as the translation mechanism translates the inflow puncturing cap from the second position to the first position, the pod top surface remains in frictional engagement with inflow puncturing cap spikes, to translate the pod away from the pod seating surface.

19. The system as recited in claim 18 wherein as the translation mechanism translates the inflow puncturing cap from the second position to the first position, the resilient guide member abuts against the pod sidewalls, urging the pod downwardly, out of frictional engagement with the input flow puncturing cap, and out of the translation mechanism.

20. A system for mixing and dispensing a beverage using a disposable pod releasably held in a well in an outflow puncturing cap housing, the pod having a top surface pierced by a plurality of inflow puncturing cap spikes which move along a longitudinal axis between a first position in which the inflow puncturing cap spikes are separated from the pod top surface and a second position in which the inflow puncturing cap spikes pierce the pod top surface, the system comprising:

a) the disposable pod having the pod top surface and further comprising a solute contained in the pod, a pod top rim and a pod body defining sidewalls having a concave inner surface and a pod base, the pod base defining a pod lower surface and a base outer rim extending about the pod lower surface intermediate the pod lower surface and the sidewalls, the concave inner surface extending along an axial length of the pod from the pod top rim to the pod base; and b) an inflow puncturing cap having opposing first and second inflow puncturing cap surfaces with inflow puncturing cap fluid receiving conduits extending between those first and second inflow puncturing cap surfaces, the plurality of inflow puncturing cap spikes being located on the first inflow puncturing cap surface and extending toward the pod top surface and having no fluid channels passing along a length of the inflow puncturing cap spikes, the first inflow puncturing cap surface having a plurality of inflow puncturing cap fluid distribution conduits formed in the first inflow puncturing cap surface and extending from the inflow puncturing cap fluid receiving conduits to other locations across the first inflow puncturing cap surface; and c) the outflow puncturing cap housing further comprising an outflow puncturing cap forming a bottom of the well, the outflow puncturing cap having a plurality of outflow puncturing cap spikes extending into the well, the outflow puncturing cap spikes having a spike internal channel extending therethrough, the spike internal channel defining a spike fluid entry port inside the well and a spike fluid discharge port outside the well that is in fluid communication with an outflow puncturing cap conduit that extends from the well through the outflow puncturing cap so that discharge fluid from the inside the well may flow through the spike internal channels and through the outflow puncturing cap discharge conduit to exit the well; and wherein when the inflow puncturing cap housing is in the first position the inflow and outflow puncturing caps are separated a distance sufficient to allow the pod to be inserted into the well; and wherein the pod lower surface is deformable in response to receipt of solvent at a temperature and pressure sufficient to expand and press the pod lower surface against the outflow puncturing cap spikes, causing the outflow puncturing cap spikes to puncture the pod lower surface, enabling fluid discharge from the pod.

* * * * *